(12) United States Patent
Wu

(10) Patent No.: US 11,523,442 B2
(45) Date of Patent: Dec. 6, 2022

(54) RANDOM ACCESS RESOURCE SELECTION METHOD AND TERMINAL DEVICE

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 91 days.

(21) Appl. No.: 17/110,869

(22) Filed: Dec. 3, 2020

(65) Prior Publication Data

US 2021/0092766 A1    Mar. 25, 2021

Related U.S. Application Data

(63) Continuation of application No. PCT/CN2019/089158, filed on May 30, 2019.

(30) Foreign Application Priority Data

Jun. 19, 2018    (CN) .......................... 201810632087.2

(51) Int. Cl.
*H04W 74/08*    (2009.01)
*H04B 7/06*    (2006.01)
*H04L 5/00*    (2006.01)
*H04W 24/10*    (2009.01)
*H04W 56/00*    (2009.01)

(52) U.S. Cl.
CPC ........ *H04W 74/085* (2013.01); *H04B 7/0626* (2013.01); *H04L 5/0051* (2013.01); *H04W 24/10* (2013.01); *H04W 56/001* (2013.01)

(58) Field of Classification Search
CPC . H04W 74/085; H04W 56/001; H04W 24/10; H04B 7/0626; H04L 5/0051
See application file for complete search history.

(56) References Cited

U.S. PATENT DOCUMENTS

| | | | |
|---|---|---|---|
| 2019/0182870 A1* | 6/2019 | Shih | H04W 74/004 |
| 2020/0052767 A1* | 2/2020 | Wang | H04W 74/02 |
| 2020/0128582 A1* | 4/2020 | Chen | H04W 74/085 |
| 2021/0250997 A1* | 8/2021 | Agiwal | H04W 74/085 |
| 2021/0410199 A1* | 12/2021 | Rico Alvarino | H04W 72/02 |

FOREIGN PATENT DOCUMENTS

| | | | | |
|---|---|---|---|---|
| CN | 102802270 A | 11/2012 | | |
| EP | 3634074 B1 * | 7/2021 | ........ | H04W 74/0833 |
| WO | WO-2019178729 A1 * | 9/2019 | | |

OTHER PUBLICATIONS

Extended European Search Report related to Application No. 19821831.5 dated Jul. 8, 2021.

(Continued)

*Primary Examiner* — Deepa Belur
(74) *Attorney, Agent, or Firm* — von Briesen & Roper, s.c.

(57) ABSTRACT

A random access resource selection method and a terminal device are provided. The random access resource selection method includes: determining a first moment at which a terminal device determines that the reception of a random access response signal is unsuccessful; selecting a delay time according to a received backoff indicator BI value; and selecting a random access resource according to the first moment and the delay time.

9 Claims, 3 Drawing Sheets

(56) References Cited

OTHER PUBLICATIONS

Huawei, et al., "Addition of Random access test case 7.1.1.1.4", May 21-25, 2018, 3GPP TSG RAN WG5#79, Busan, South Korea, R5-182405.
International Search Report & Written Opinion related to Application No. PCT/CN20191/089158; dated Dec. 30, 2020.
Ericsson, "Further discussions on prioritized RACH access", Feb. 26-Mar. 2, 2018, 3GPP TSG-RAN WG2 #101, Athens, Greece.

* cited by examiner

RANDOM ACCESS RESOURCE SELECTION METHOD AND TERMINAL DEVICE

CROSS REFERENCE TO RELATED APPLICATIONS

This application is a continuation application of PCT International Application No. PCT/CN2019/089158 filed on May 30, 2019, which claims priority to Chinese Patent Application No. 201810632087.2 filed on Jun. 19, 2018 in China, both disclosrues of which are incorporated herein by reference in their entireties.

TECHNICAL FIELD

The present disclosure relates to the field of communications technologies, and in particular, to a random access resource selection method and a terminal device.

BACKGROUND

After a terminal device, for example, user equipment (User Equipment, UE) initiates a random access procedure, if a measurement result of a configured synchronous signal block (Synchronous Signal Block, SSB) and/or channel state information reference signal (Channel State Information-Reference Signal, CSI-RS) is above a preset threshold, the UE may select a random access channel (physical random access channel, PRACH) resource corresponding to the configured SSB and/or CSI-RS, to transmit a random access signal, for example, an Msg1. The preset threshold may be configured by the network side. For example, rsrp-ThresholdSSB configured by the network side may be used for a decision based on the measurement result of an SSB, and/or rsrp-ThresholdCSI-RS configured by the network side may be used for a decision based on the measurement result of a CSI-RS.

After transmitting the Msg1, the UE may receive a random access response (Random Access Response, RAR) within a random access response window. However, if the UE has not successfully received, in the random access response window, an RAR, for example, an Msg2, corresponding to the Msg1 sent by the UE, and the network side indicates a backoff indicator (Backoff Indicator, BI) value (for example, 40 ms), the UE may first randomly select a delay time (for example, 20 ms) according to the BI value, and then delay next transmission or retransmission of the Msg1 by the delay time.

Currently, after the reception of the Msg2 is unsuccessful, the UE, usually, immediately starts to select a next random access resource, that is, select a PRACH resource corresponding to an SSB and/or a CSI-RS whose measurement result is above a preset threshold. However, with introducing the BI value, if the UE delays the next transmission of the Msg1 according to the received BI value, a measurement result of an SSB and/or a CSI-RS corresponding to a PRACH resource actually used by the UE to transmit the Msg1 may already be below the preset threshold. In this case, the transmission of the Msg1 is aborted. As a result, the transmission of the Msg1 in a current random access procedure fails, and the failure probability of the random access procedure is increased.

SUMMARY

Embodiments of the present disclosure provide a random access resource selection method and a terminal device, to resolve a problem that after a BI value is currently introduced, a random access procedure fails because a random access resource is immediately selected after the reception of a random access response is unsuccessful.

According to a first aspect, an embodiment of the present disclosure provides a random access resource selection method, including:

determining a first moment at which a terminal device determines that the reception of a random access response signal is unsuccessful;

selecting a delay time according to a received BI value; and selecting a random access resource according to the first moment and the delay time.

According to a second aspect, an embodiment of the present disclosure further provides a terminal device, including:

a determining module, configured to determine a first moment at which a terminal device determines that the reception of a random access response signal is unsuccessful;

a first selection module, configured to select a delay time according to a received BI value; and a second selection module, configured to select a random access resource according to the first moment and the delay time.

According to a third aspect, an embodiment of the present disclosure further provides a terminal device, including a memory, a processor, and a computer program stored in the memory and executable on the processor. When the computer program is executed by the processor, the steps in the foregoing random access resource selection method are performed.

According to a fourth aspect, an embodiment of the present disclosure further provides a computer readable storage medium, where the computer readable storage medium stores a computer program. When the computer program is executed by a processor, the steps in the foregoing random access resource selection method are performed.

In the embodiments of the present disclosure, because the delay time selected according to the BI value is considered when the random access resource is selected, after introduction of the BI value enables backoff of transmission of the random access signal, the random access resource that is close to actual transmission of the random access signal and that satisfies a requirement can be selected, to transmit the random access signal. Therefore, a selection incorrectness probability of the random access resource that is caused by delayed transmission of the random access signal is reduced, and random access failures are reduced.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

DESCRIPTION OF EMBODIMENTS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

Figure 1:
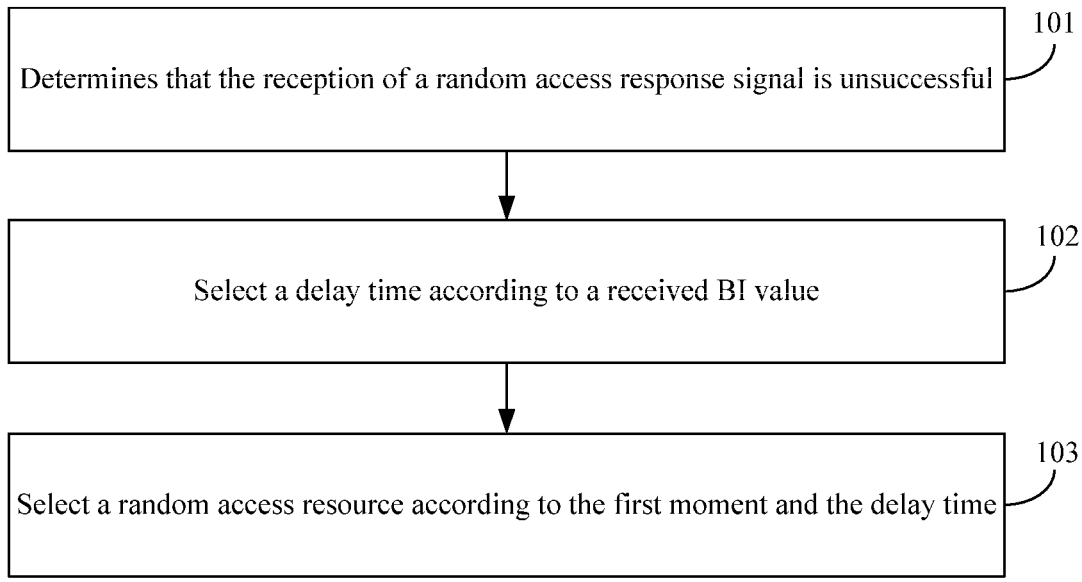
FIG. 1 is a flowchart of a random access resource selection method according to an embodiment of the present disclosure.

As shown in FIG. 1, an embodiment of the present disclosure provides a random access resource selection method, applied to a terminal device. The method includes the following steps:

Step 101: Determine a first moment at which a terminal device determines that the reception of a random access response signal is unsuccessful.

After the terminal device transmits a random access signal, if the terminal device has not received, in a random access response window, the random access response signal corresponding to the random access signal, the terminal device may determine that the reception of the random access response signal is unsuccessful.

Step 102: Select a delay time according to a received BI value.

It should be noted that the BI value in step 102 may be sent by a network side to the terminal device. When selecting the delay time according to the received BI value, the terminal device may randomly select a delay time. For example, if the received BI value is 40 S, the delay time selected by the terminal device may be 10 S, 25 S, or the like, as long as the delay time is between 0 and 40 S.

Step 103: Select a random access resource according to the first moment and the delay time.

In the random access resource selection method in this embodiment of the present disclosure, because the delay time selected according to the BI value is considered when the random access resource is selected, after introduction of the BI value enables backoff of transmission of the random access signal, the random access resource that is close to actual transmission of the random access signal and that satisfies a requirement can be selected, to transmit the random access signal. Therefore, a selection incorrectness probability of the random access resource that is caused by delayed transmission of the random access signal is reduced, and random access failures are reduced.

In this embodiment of the present disclosure, optionally, step 103 may be specifically:

selecting the random access resource after delaying the first moment by the delay time.

Figure 2:
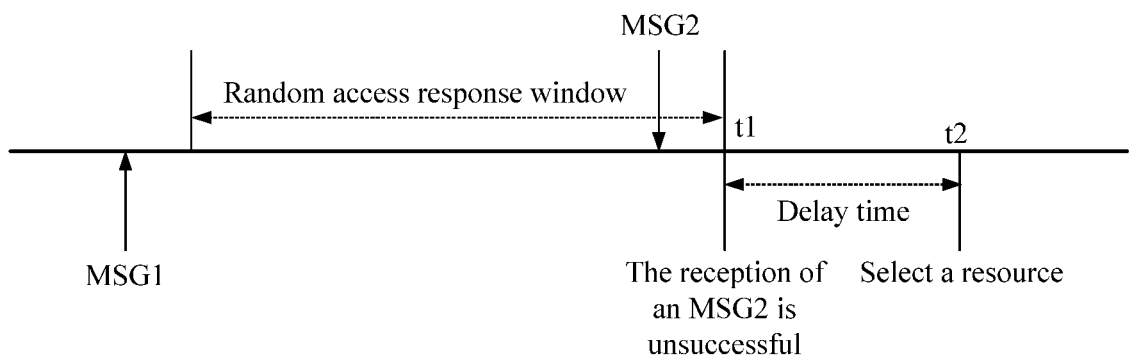
FIG. 2 is a first schematic diagram of selecting a random access resource according to an embodiment of the present disclosure.

For example, referring to FIG. 2, it is assumed that after transmitting an Msg1, UE has not successfully received, in the random access response window, a random access response signal Msg2 corresponding to the Msg1, and determines, at a t1 moment, that the reception of the Msg2 is unsuccessful, and after receiving the BI value sent by the network side, the UE randomly selects a delay time backoffDelay (that is, a delay amount) according to the BI value. In this case, the UE may select the random access resource after delaying the t1 moment by the backoffDelay, for example, after a t2 moment, that is, delay selection of the random access resource in a subsequent random access procedure by a period of the backoffDelay.

In this embodiment of the present disclosure, optionally, step 103 may be specifically:

selecting the random access resource at the first moment; and when a signal measurement result corresponding to a random access resource selected before a second moment is below a preset threshold, selecting a random access resource again until the second moment, where the second moment is determined according to the first moment and the delay time.

The signal measurement result may be a measurement result of an SSB and/or a CSI-RS.

Optionally, the second moment may be a moment obtained by delaying the first moment by the delay time, or may be a moment when the random access signal is sent after delaying the first moment by the delay time.

Figure 3:
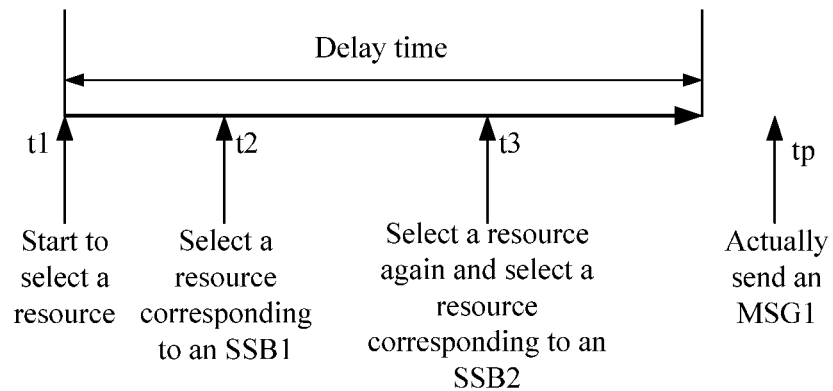
FIG. 3 is a second schematic diagram of selecting a random access resource according to an embodiment of the present disclosure.

For example, referring to FIG. 3, it is assumed that after transmitting the Msg1, UE has not successfully received, in the random access response window, the random access response signal Msg2 corresponding to the Msg1, and determines, at the t1 moment, that the reception of the Msg2 is unsuccessful, and after receiving the BI value sent by the network side, the UE randomly selects a delay time backoffDelay according to the BI value. In this case, the UE may select the random access resource when the t1 moment starts, and according to configuration information of the network side, if a measurement result that is of an SSB or a CSI-RS and that is measured by the UE is above the preset threshold, the UE may select, at the t2 moment, the random access resource corresponding to the SSB1 (in this case, the measurement result of the SSB1 is above the preset threshold), to transmit the Msg1. However, if the measurement result of the SSB1 is below or equal to the threshold before a tp moment, for example, the measurement result of the SSB1 at a t3 moment in FIG. 3 is below or equal to threshold, where the tp moment is a moment at which the Msg1 is sent after the t1 moment is delayed by the backoffDelay, the UE may select a random access resource again until the tp moment, and change a corresponding random access resource, for example, change to a random access resource corresponding to an SSB2 (in this case, a measurement result of the SSB2 is greater than the threshold).

Figure 4:
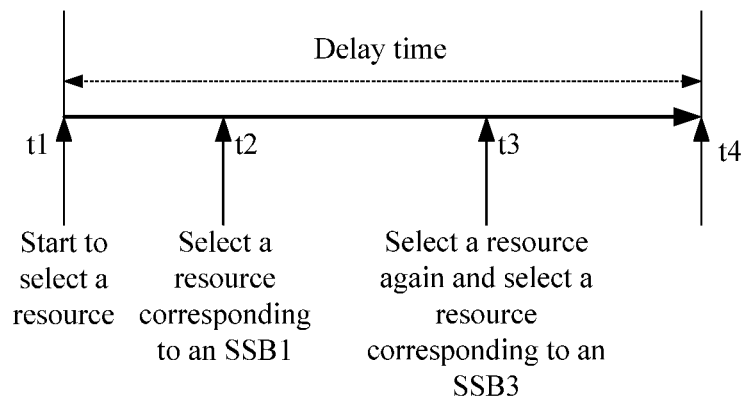
FIG. 4 is a third schematic diagram of selecting a random access resource according to an embodiment of the present disclosure.

For another example, referring to FIG. 4, it is assumed that after transmitting the Msg1, UE has not successfully received, in the random access response window, the random access response signal Msg2 corresponding to the Msg1, and determines, at the t1 moment, that the reception of the Msg2 is unsuccessful, and after receiving the BI value sent by the network side, the UE randomly selects a delay time backoffDelay according to the BI value. In this case, the UE may select the random access resource when the t1 moment starts, and according to configuration information of the network side, if a measurement result that is of an SSB or a CSI-RS and that is measured by the UE is above the preset threshold, the UE may select, at the t2 moment, the random access resource corresponding to the SSB1 (in this case, the measurement result of the SSB1 is above the preset threshold), to transmit the Msg1. However, if the measurement result of the SSB1 is below or equal to the threshold before a t4 moment, for example, the measurement result of the SSB1 at a t3 moment in FIG. 4 is below or equal to threshold, where the t4 moment is a moment obtained by delaying the t1 moment by the backoffDelay, the UE may select a random access resource again until the t4 moment, and change a corresponding random access resource, for example, change to a random access resource corresponding to an SSB3 (in this case, a measurement result of the SSB3 is greater than the threshold).

The random access resource selection method of the present disclosure is described in the foregoing embodiments. A terminal device of the present disclosure is described below with reference to embodiments and accompanying drawings.

Figure 5:
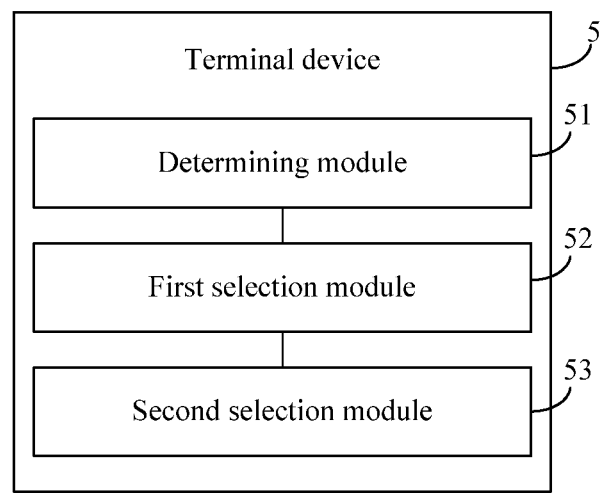
FIG. 5 is a first schematic structural diagram of a terminal device according to an embodiment of the present disclosure.

As shown in FIG. 5, an embodiment of the present disclosure further provides a terminal device 5, including: a determining module 51, a first selection module 52, and a second selection module 53. Details are described below.

The determining module 51 is configured to determine a first moment at which a terminal device determines that the reception of a random access response signal is unsuccessful.

The first selection module 52 is configured to select a delay time according to a received BI value.

The second selection module 53 is configured to select a random access resource according to the first moment and the delay time.

Because the delay time selected according to the BI value is considered when the random access resource is selected, after introduction of the BI value enables backoff of transmission of the random access signal, the terminal device in this embodiment of the present disclosure can select the random access resource that is close to actual transmission of the random access signal and that satisfies a requirement, to transmit the random access signal. Therefore, a selection incorrectness probability of the random access resource that is caused by delayed transmission of the random access signal is reduced, and random access failures are reduced.

In this embodiment of the present disclosure, optionally, the second selection module 53 is specifically configured to:
select the random access resource after the first moment is delayed by the delay time.
Optionally, the second selection module 53 includes:
a first selection unit, configured to select the random access resource at the first moment; and
a second selection unit, configured to: when a signal measurement result corresponding to a random access resource selected before a second moment is below a preset threshold, select a random access resource again until the second moment, where
the second moment is determined according to the first moment and the delay time.
Optionally, the second moment is a moment obtained by delaying the first moment by the delay time; or
the second moment is a moment when the random access signal is sent after delaying the first moment by the delay time.
Optionally, the signal measurement result is a measurement result of an SSB and/or a CSI-RS.

An embodiment of the present disclosure further provides a terminal device, including: a processor, a memory, and a computer program stored in the memory and executable on the processor. When the computer program is executed by the processor, processes in the embodiments of the random access resource selection method may be performed, and the same technical effect can be achieved. To avoid repetition, details are not described herein again.

Figure 6:
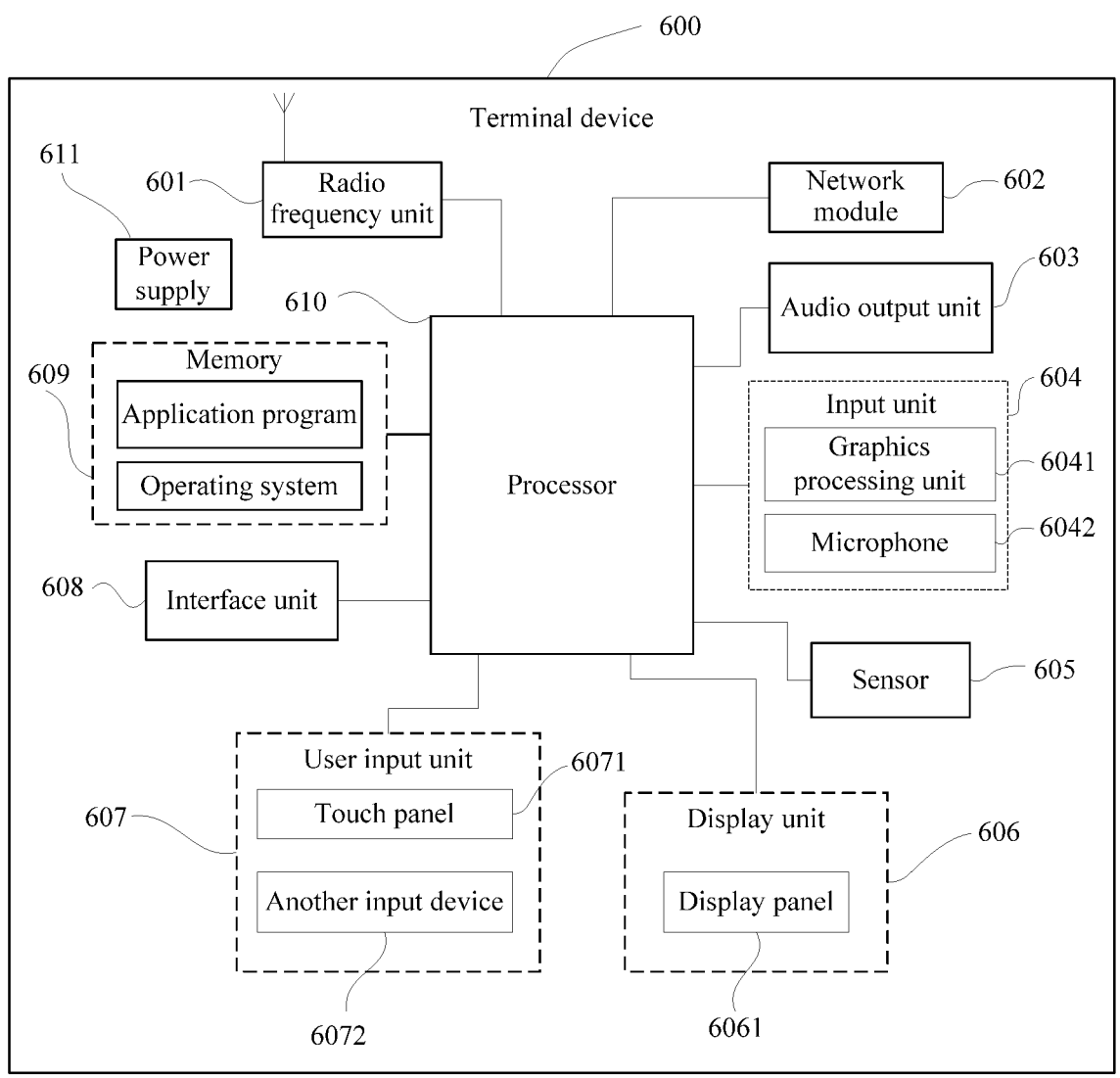
FIG. 6 is a second schematic structural diagram of a terminal device according to an embodiment of the present disclosure.

Specifically, FIG. 6 is a schematic structural diagram of hardware of a terminal device 600 implementing various embodiments of the present disclosure. The terminal device 600 includes, but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal shown in FIG. 6 does not constitute a limitation to the terminal. The terminal device may include more or fewer components than those shown in the figure, or some components are combined, or a different component arrangement is used. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The processor 610 is configured to: determine a first moment at which a terminal device determines that the reception of a random access response signal is unsuccessful; select a delay time according to a received BI value; and select a random access resource according to the first moment and the delay time.

Because the delay time selected according to the BI value is considered when the random access resource is selected, after introduction of the BI value enables backoff of transmission of the random access signal, the terminal device 600 in this embodiment of the present disclosure can select the random access resource that is close to actual transmission of the random access signal and that satisfies a requirement, to transmit the random access signal. Therefore, a selection incorrectness probability of the random access resource that is caused by delayed transmission of the random access signal is reduced, and random access failures are reduced.

It should be understood that, in this embodiment of the present disclosure, the radio frequency unit 601 may be configured to receive and transmit a signal during a process of receiving and transmitting information or a call. Specifically, the radio frequency unit 601 receives downlink data from a base station, and transmits the downlink data to the processor 610 for processing; and transmits uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 can further communicate with a network and another device via a wireless communications system.

The terminal device provides a user with wireless broadband Internet access through the network module 602, for example, helps the user transmit and receive emails, browse web pages, and access streaming media.

The audio output unit 603 can convert audio data received by the radio frequency unit 601 or the network module 602 or stored in the memory 609 into an audio signal, and output the audio signal as sound. In addition, the audio output unit 603 can also provide audio output related to a specific function performed by the terminal device 600 (for example, call signal receiving sound or message receiving sound). The audio output unit 603 includes a loudspeaker, a buzzer, a telephone receiver, and the like.

The input unit 604 is configured to receive audio or video signals. The input unit 604 may include a graphics processing unit (Graphics Processing Unit, GPU) 6041 and a microphone 6042. The graphics processing unit 6041 processes image data of a static picture or a video obtained by an image capturing apparatus (for example, a camera) in a video capturing mode or an image capturing mode. A processed image frame can be displayed on the display unit 606. The image frame processed by the graphics processing unit 6041 can be stored in the memory 609 (or another storage medium) or sent by the radio frequency unit 601 or the network module 602. The microphone 6042 can receive sound, and can process such sound into audio data. The processed audio data can be converted, in a telephone calling mode, into a format that can be sent by the radio frequency unit 601 to a mobile communications base station for output.

The terminal device 600 further includes at least one sensor 605, such as a light sensor, a motion sensor, and other sensors. Specifically, the light sensor includes an ambient light sensor and a proximity sensor, where the ambient light sensor can adjust brightness of the display panel 6061 based on brightness of ambient light, and the proximity sensor can turn off the display panel 6061 and/or backlight when the terminal device 600 moves towards the ear. As a motion sensor, an accelerometer sensor can detect magnitude of acceleration in various directions (usually, three axes), can detect magnitude and the direction of gravity when it is stationary, can be configured to identify terminal postures (for example, switching between a portrait mode and a landscape mode, related games, and magnetometer posture calibration), and can perform functions related to vibration identification (for example, a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein again.

The display unit 606 is configured to display information entered by a user or information provided for the user. The display unit 606 may include the display panel 6061, and the display panel 6061 may be configured in a form of a liquid crystal display (Liquid Crystal Display, LCD), an organic light-emitting diode (Organic Light-Emitting Diode, OLED), and the like.

The user input unit 607 can be configured to receive inputted numeric or character information, and generate key signal inputs related to user settings and function control of the terminal. Specifically, the user input unit 607 includes a touch panel 6071 and another input device 6072. The touch panel 6071, also referred to as a touch screen, can collect a touch operation of the user on or near the touch panel 6071 (for example, an operation performed by the user by using any suitable object or accessory such as a finger or a stylus on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 can be implemented in various types such as resistive, capacitive, infrared, and surface acoustic wave. In addition to the touch panel 6071, the user input unit 607 may further include the another input device 6072. Specifically, the another input device 6072 may include, but is not limited to, a physical keyboard, function keys (for example, a volume control key and a switch key), a trackball, a mouse, and a joystick. Details are not described herein again.

Further, the touch panel 6071 can cover the display panel 6061. After the touch panel 6071 detects a touch operation on or near the touch panel 6071, the touch panel 6071 transmits the touch operation to the processor 610 to determine a type of a touch event. Subsequently, the processor 610 provides corresponding visual output on the display panel 6061 according to the type of the touch event. Although in FIG. 6, the touch panel 6071 and the display panel 6061 serve as two independent components to implement input and output functions of the terminal, in some embodiments, the touch panel 6071 and the display panel 6061 can be integrated to implement the input and output functions of the terminal. Details are not limited herein.

The interface unit 608 is an interface connecting an external apparatus to the terminal device 600. For example, the external apparatus can include a wired or wireless headphone port, an external power supply (or a battery charger) port, a wired or wireless data port, a memory card port, a port for connection with an apparatus having an identification module, an audio input/output (I/O) port, a video I/O port, an earphone port, and the like. The interface unit 608 can be configured to receive an input (for example, data information and power) from the external apparatus and transmit the received input to one or more elements in the terminal device 600, or transmit data between the terminal device 600 and the external apparatus.

The memory 609 may be configured to store a software program and various data. The memory 609 may mainly include a program storage area and a data storage area. The program storage area may store an operating system, an application program required by at least one function (for example, a sound playback function and an image display function), and the like. The data storage area may store data (for example, audio data and a phone book) created based on use of the mobile phone, and the like. In addition, the memory 609 may include a high-speed random access memory and may further include a nonvolatile memory, for example, at least one magnetic disk storage device, a flash memory device, or another volatile solid-state storage device.

The processor 610 is a control center of the terminal device, connects various parts of the entire terminal by using various interfaces and circuits, and performs various functions of the terminal and processes data by running or executing the software program and/or a module stored in the memory 609 and invoking data stored in the memory 609, to monitor the terminal as a whole. The processor 610 may include one or more processing units. Optionally, the processor 610 may be integrated with an application processor and a modem processor. The application processor mainly processes an operating system, a user interface, an application program, and the like. The modem processor mainly processes wireless communication. It may be understood that the foregoing modem processor may not be integrated with the processor 610.

The terminal device 600 may further include a power supply 611 (for example, a battery) that supplies power to various components. Optionally, the power supply 611 may be logically connected to the processor 610 through a power supply management system, to perform functions of managing charging, discharging, and power consumption through the power supply management system.

In addition, the terminal device 600 may further include some functional modules not shown. Details are not described herein again.

An embodiment of the present disclosure further provides a computer readable storage medium, where the computer readable storage medium stores a computer program, when the computer program is executed by a processor, the processes of the foregoing embodiments of the random access resource selection method can be performed, and the same technical effects can be achieved. To avoid repetition, details are not described herein again. The computer readable storage medium may be a read-only memory (Read-Only Memory, ROM), a random access memory (Random Access Memory, RAM), a magnetic disk, an optical disc, and the like.

It should be noted that in this specification, the terms "comprise", "include" and any other variants thereof are intended to cover non-exclusive inclusion, so that a process, a method, an article, or an apparatus that includes a series of elements not only includes these very elements, but also may include other elements not expressly listed, or include elements inherent to this process, method, article, or apparatus. Without being subject to further limitations, an element defined by a phrase "including a . . . " does not exclude presence of other identical elements in the process, method, article, or apparatus that includes the very element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the related technologies may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skill in the art may make many forms without departing from aims of the present disclosure and the protection scope of claims, all of which fall within the protection of the present disclosure.

The invention claimed is:

1. A random access resource selection method, comprising:
    determining a first moment at which a terminal device determines that the reception of a random access response signal is unsuccessful;
    selecting a delay time according to a received backoff indicator BI value; and
    selecting a random access resource according to the first moment and the delay time,
    wherein selecting the random access resource according to the first moment and the delay time comprises:
    selecting the random access resource after the first moment is started; and
    when a signal measurement result corresponding to a random access resource selected before a second moment is below a preset threshold, selecting a random access resource again until the second moment, wherein the second moment is determined according to the first moment and the delay time.

2. The selection method according to claim 1, wherein the second moment is a moment obtained by delaying the first moment by the delay time; or
    the second moment is a moment when the random access signal is sent after delaying the first moment by the delay time.

3. The selection method according to claim 1, wherein the signal measurement result is a measurement result of a synchronous signal block SSB and/or a channel state information reference signal CSI-RS.

4. A terminal device, comprising: a memory, a processor, and a program stored in the memory and executable on the processor, wherein when the program is executed by the processor, the processor is configured to:
    determine a first moment at which a terminal device determines that the reception of a random access response signal is unsuccessful;
    select a delay time according to a received BI value; and
    select a random access resource according to the first moment and the delay time,
    wherein, the processor is specifically configured to:
    select the random access resource after the first moment is started; and
    when a signal measurement result corresponding to a random access resource selected before a second moment is below a preset threshold, select a random access resource again until the second moment, wherein the second moment is determined according to the first moment and the delay time.

5. The terminal device according to claim 4, wherein the second moment is a moment obtained by delaying the first moment by the delay time; or
    the second moment is a moment when the random access signal is sent after delaying the first moment by the delay time.

6. The terminal device according to claim 4, wherein the signal measurement result is a measurement result of an SSB and/or a CSI-RS.

7. A non-transient computer readable storage medium, wherein the computer readable storage medium stores a program, and the program is executed by a processor to perform following steps:
    determining a first moment at which a terminal device determines that the reception of a random access response signal is unsuccessful;
    selecting a delay time according to a received backoff indicator BI value; and
    selecting a random access resource according to the first moment and the delay time,
    wherein, the program is executed by the processor to:
    select the random access resource after the first moment is started; and
    when a signal measurement result corresponding to a random access resource selected before a second moment is below a preset threshold, select a random access resource again until the second moment, wherein the second moment is determined according to the first moment and the delay time.

8. The non-transient computer readable storage medium according to claim 7, wherein the second moment is a moment obtained by delaying the first moment by the delay time; or the second moment is a moment when the random access signal is sent after delaying the first moment by the delay time.

9. The non-transient computer readable storage medium according to claim 7, wherein the signal measurement result is a measurement result of an SSB and/or a CSI-RS.

* * * * *